United States Patent [19]

Christen, Jr. et al.

[11] Patent Number: 4,665,888

[45] Date of Patent: May 19, 1987

[54] SERVING TABLE FOR KETTLE-TYPE BARBECUE COOKER

[75] Inventors: Louis J. Christen, Jr., St. Louis, Mo.; Henry P. Glass, Winnetka County, Ill.

[73] Assignee: Christen, Incorporated, St. Louis, Mo.

[21] Appl. No.: 809,311

[22] Filed: Dec. 16, 1985

[51] Int. Cl.[4] .......................... A47J 37/00; F24B 3/00
[52] U.S. Cl. ................................ 126/25 R; 126/37 A; 108/97
[58] Field of Search ................ 126/25 R, 27, 9 R, 33, 126/275 R; 108/50, 69, 79, 81, 82, 90, 97, 131

[56] References Cited

U.S. PATENT DOCUMENTS

| | | | |
|---|---|---|---|
| 1,792,721 | 2/1931 | Wilson | 126/37 A |
| 2,886,386 | 5/1959 | Spitzer | 126/25 R |
| 2,922,529 | 1/1960 | Culbertson | 126/25 R X |
| 3,809,051 | 5/1974 | Giroux | 126/25 R X |
| 3,866,994 | 2/1975 | Bonin | 126/25 R X |
| 4,416,248 | 11/1983 | Schlosser | 126/25 R X |

Primary Examiner—Larry Jones
Attorney, Agent, or Firm—Kalish & Gilster

[57] ABSTRACT

An auxiliary or serving table for use with a kettle type barbecue cooker which comprises a top having an inner end and an outer end. Legs are provided at the outer end for swingable movement between operative position wherein the same are axially perpendicular to the plane of the table top and inoperative condition wherein the legs are substantially coplanar with the table top. The table is connected at the inner end thereof to the firebowl of the cooker by means of brackets which engage the cooker and hinges which are engaged to the related bracket and to the table top.

13 Claims, 7 Drawing Figures

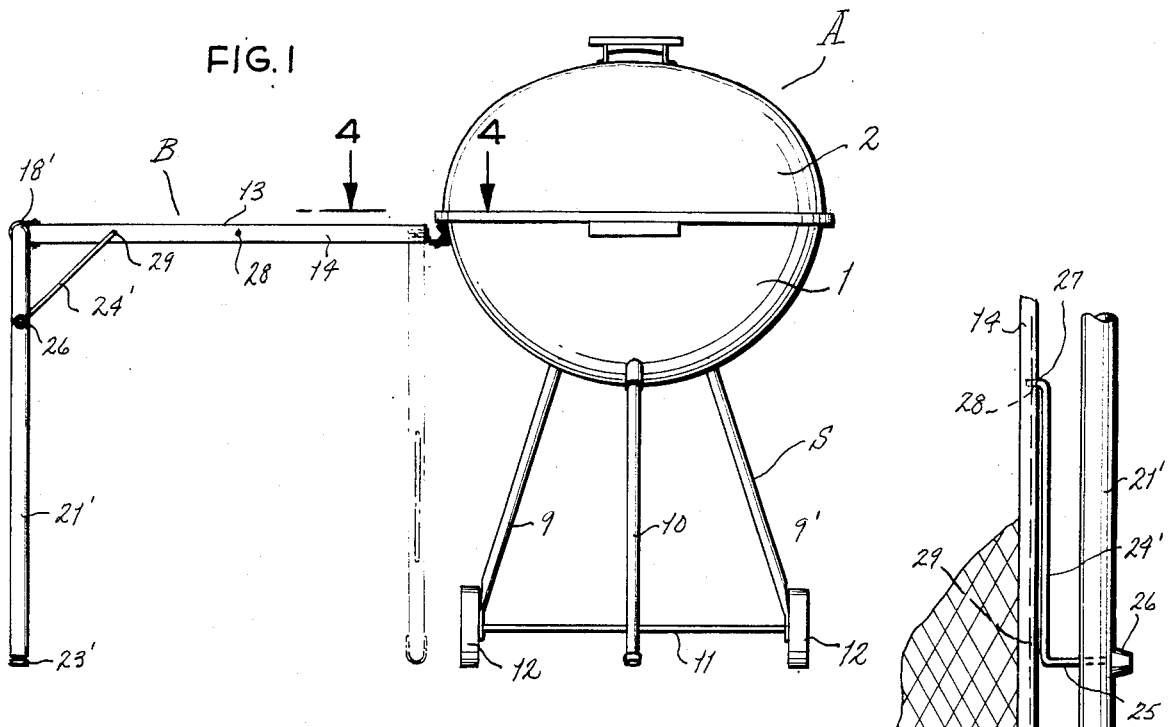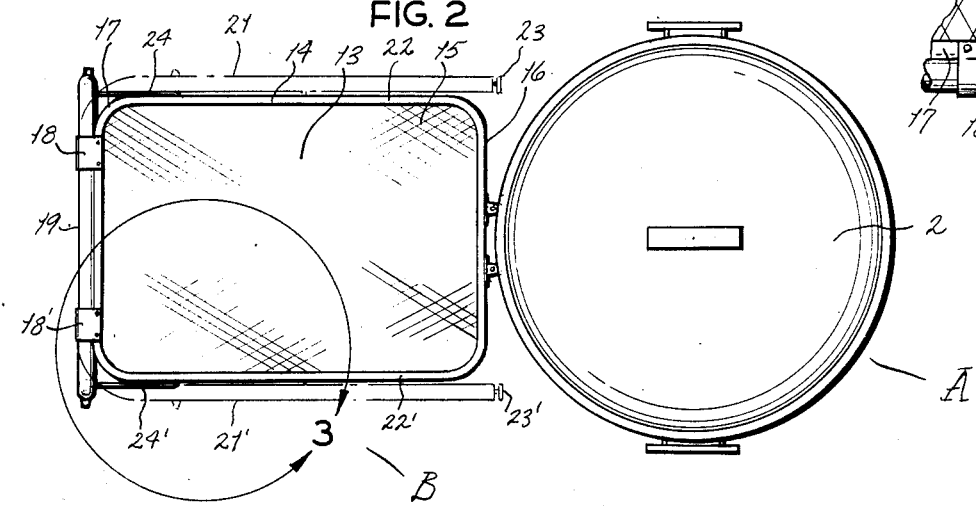

SERVING TABLE FOR KETTLE-TYPE BARBECUE COOKER

This invention relates in general to tables and, more particularly, to a serving or auxiliary table adapted for use with kettle-type barbecue cookers.

In the practice of barbecuing by cookers of either stationary or mobile character, there has been the constant problem of providing a conveniently located surface for supporting utensils, plates and other articles as well as food items necessary for the barbecue operation, as well as for facilitating serving or dispensing the prepared barbecue. Customarily, individuals engaging in barbecuing are forced to transport implements and food between the cooker and a relatively distant table, counter or other support surface. Such inconvenience has been accepted as a condition of barbecuing, particularly as cookers are normally utilized out of doors and article and/or food support surfaces are customarily indoors. Otherwise, the individual is obligated to transport a table from the dwelling interior to the vicinity of the cooker and then must return same after the operation has been completed. There have been no efforts made to expeditiously obviate such inconvenience.

Therefore, it is an object of the present invention to provide an auxiliary or serving table for engagement with a kettle-type barbecue cooker so that during use such will be immediately adjacent the cooker for maximum convenience, for receiving utensils, implements and food items, as well as for serving of the barbecued meat.

It is another object of the present invention to provide a table of the type above stated which is collapsible into compact state when in disuse, remaining in engagement with the associated cooker for immediate availability upon subsequent use of the cooker.

It is another object of the present invention to provide a table of the type above described having means of securement to the associated cooker which is reliable, being inhibitive of accidental displacement, but which permits of facile intentional disengagement.

It is a still further object of the present invention to provide a table of the type described which is constructed of sturdy, but yet lightweight, components; which is adapted for stable disposition in either operative or inoperative state; which is economic in manufacture; which may be utilized with existing kettle-type barbecue cookers; and which is extremely durable in usage.

BRIEF DESCRIPTION OF THE DRAWINGS

FIG. 1 is a side elevational view of an auxiliary or serving table constructed in accordance with and embodying the present invention, illustrating the same in full lines in operative position with respect to the associated cooker; and in phantom lines in collapsed, storage condition.

FIG. 2 is a top plan view of the table and cooker as shown in FIG. 1 but showing in phantom lines the table legs in inoperative position.

FIG. 3 is taken at 3 in FIG. 2.

DESCRIPTION OF THE PREFERRED EMBODIMENT

Figure 4:
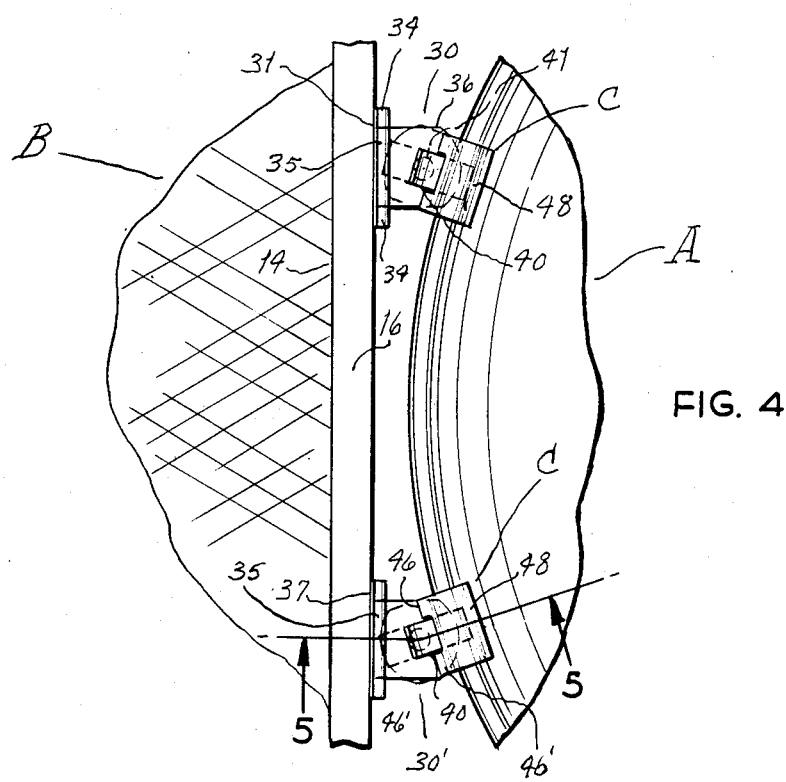
FIG. 4 is a top plan view taken on the line 4—4 of FIG. 1; the cooker closure being removed.

Referring now by reference characters to the drawings which illustrate the preferred embodiment of the present invention, A generally designates a barbecue cooker of the kettle-type comprising a substantially hemispherical firebowl 1 and a similarly shaped dome-like, or hemispherical, hood 2. As may best be seen in FIG. 5, the lower peripheral edge, indicated generally at 3, of hood 2 is turned outwardly to form a radial flange 4 integral with a short depending offset flange 5 at the outer end thereof. Said peripheral edge 3 of hood 2 is receivable upon the upper peripheral edge 6 of bowl 1 when cooker A is in closed condition; said edge 6 being rolled outwardly and thence returning inwardly toward the side wall 7 of bowl 1, but terminating spacedly therefrom, as at 8. Accordingly, when cooker A is closed, radial flange 4 of hood 2 will rest upon the upper portion of rolled edge 6 of bowl 1 (FIG. 5); and with offset flange 5 being presented immediately adjacent the outer portion of said edge 6.

Cooker A is provided with a suitable support S which may be of tripodal character, comprising legs 9,9′ and 10 which may be of tubular stock. The lower portions of legs 9,9′ are adapted for engaging an axle 11 carrying wheels 12,12′ on the projecting ends thereof, rendering cooker A mobile. Leg 10 is adapted to engage the ground or other support surface at the lower extremity thereof to form a three point support with wheels 12,12′ when cooker A is in stationary position.

It is to be understood that the support S of cooker A does not form a part of the present invention but is merely illustrative of structure rendering cooker A mobile and stable when stationary.

Provided for intimate utilization with cooker A is a table B having a top 13 comprising a frame 14, which is shown for exemplary purposes herein as being of generally rectangular form with rounded corners and being constructed of suitable sturdy lightweight metal. Suitably secured to frame 14 is an article-receiving support surface 15 which is preferably constructed of expanded metal to conduce to the relatively reduced weight of top 13.

With respect to the configuration of top 13 it will be seen that the same is presented with the inner end 16 thereof detachably and swingably engaged, by means to be described hereinbelow, to cooker A and with the opposite or outer end 17 thereof being free.

Spacedly secured to outer end 17 of frame 14 of top 13 and projecting therefrom in substantially planarwise parallel relation is a pair of U-shaped support brackets 18, 18′, cooperating with frame 14 to provide a sleeve for journalling of the intermediate portion 19 of a U-shaped table top support structure indicated generally 20. Said support structure 20 comprises a pair of legs 21, 21′ extending from opposite ends of intermediate portion 19 in axially perpendicular relationship thereto; said legs 21, 21′ and intermediate portion 19 being coplanar. By virtue of the journalling of intermediate portion 19 within brackets 18, 18′, said structure 20 is swingable with respect to top 13 as between inoperative position wherein legs 21, 21′ will be disposed in immediate axially parallel aligned condition with respect to the adjacent sides 22, 22' of frame 14 (see FIG. 3) and operative position wherein said legs 21,21' will be disposed in axially perpendicular relationship to the plane of top 13 whereby the lower ends 23, 23' of said legs 21, 21', respectively, will be disposed for engaging the ground or other support surface, as shown in full lines in FIG. 1.

In order to maintain structure 20 in selected disposition with respect to top 13, there are provided brace rods 24, 24'. Each of said brace rods 24, 24' is outturned at the normally outer end thereof, as at 25, for extension freely through an opening (not shown) in the associated leg and being inhibited from displacement by a cap 26. Brace rods 24, 24' are thus freely swingable with respect to the associated leg 21, 21'. The inner or opposite end of each brace rod 24, 24' is turned inwardly in axially parallel relation to outturned end 25 to define a finger 27 for preselected disposition in apertures 28, 29 provided in the adjacent sides, 22, 22' of frame 14. Said apertures 28, 29 are spaced apart a distance adequate for retention of support structure 20 in inoperative and operative disposition by virtue of finger 27 of brace rods 24, 24' being received within the related apertures 28, 29. It will be seen that outturned end 25 is of such extent as to permit outward movement of brace rods 24, 24' a distance adequate to effect removal of finger 27 from the selected aperture 28, 29 and conversely for acceptance of said finger 27 therein.

With reference now particularly to FIGS. 4–7, inclusive, the unique means for detachably and swingably engaging table B to cooker A will now be described. A pair of connectors generally indicated 30, 30' are provided in spaced apart relation on end 16 of frame 14 of table B which is presented in confrontation to cooker A when table B is in operative position as shown in FIG. 1. Each connector 30, 30' is comprised of a hinge 31 and a bracket 32. Hinge 31 includes an upper leaf 33 suitably engaged, to frame 14, as by welding. In the lower end portion thereof, leaf 33 is provided with knuckles 34, for receiving coordinating knuckles 35 of a cooperating lower leaf 36 to accept a hinge pin or pintle 37. Hinge leaf 36 is relatively reduced transversely with respect to upper hinge leaf 33, and with the free end thereof being arcuated. Engaged to said hinge leaf 36 beneath, and planarwise parallel to the under face 36' thereof, is the base 38 of a hanger bracket C; with there being sandwiched between said base 38 and hinge under face 36 the bottom leg 39 of a bracket lock 40; said engagement being effected by means of a single swivel rivet 41 to permit relative swingability of bracket C and lock 40 for adjustment as may be required by the diameter of the particular cooker A. Said bracket base 38 extends a sufficient distance beyond the free end of the associated leaf 36 to contact cooker side wall 7, as at 42, whence bracket C is reversely turned to provide a central portion 42 which is in overlying relationship to the upper surface of the free end portion of leaf 36. Said bracket central portion 42 which terminates immediately adjacent swivel rivet 41, is of bipart character by reason of the same being cut-away in the midsection thereof as at 44, thereby developing side portions 45, 45' which are continuous with upwardly extending, integral legs 46, 46', said cut-away 44 being continuous with a like opening 47 between said last mentioned legs 46, 46'. Legs 46, 46' terminate with bracket upper end 48 which is arcuated upon an angle for supported disposition of bracket C upon rolled edge 6 cooker bowl 1.

Figure 5:
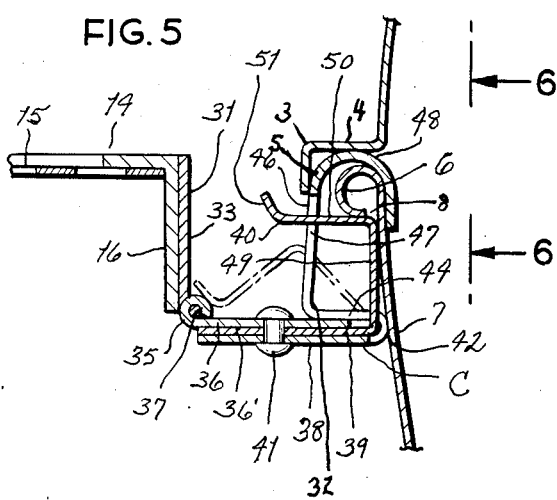
FIG. 5 is a vertical transverse sectional view taken on the line 5—5 of FIG. 4, but with cooker closure being included.
Figure 6:
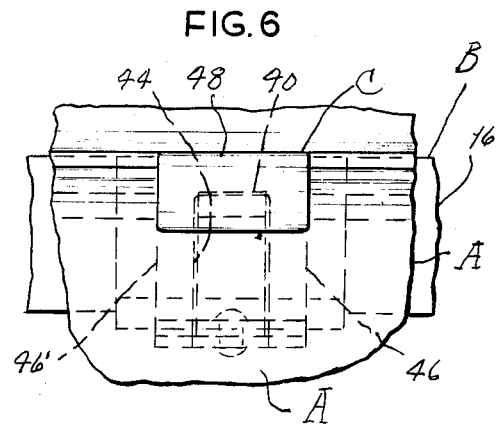
FIG. 6 is a fragmentary view taken on the line 6—6 of FIG. 5.
Figure 7:
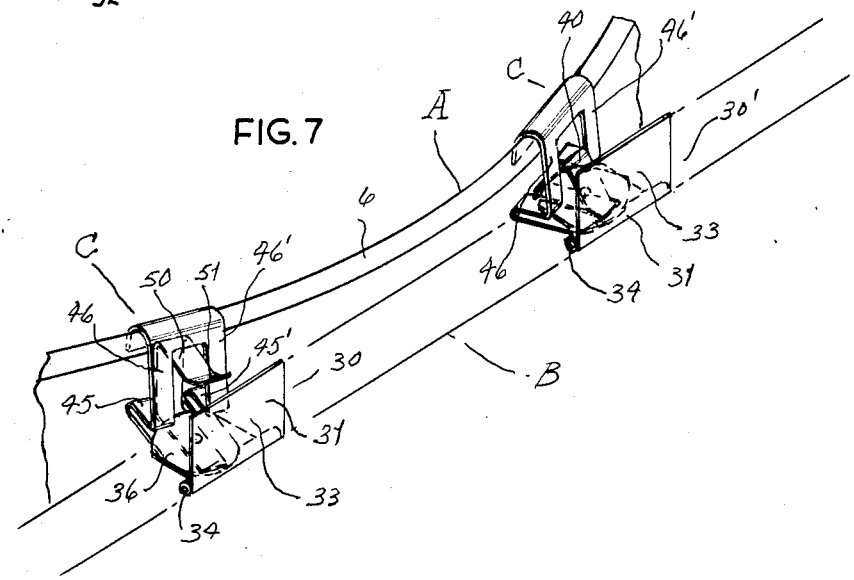
FIG. 7 is a fragmentary enlarged perspective view of the connectors.

Bracket lock 40 is designed to assure against accidental displacement or withdrawal of bracket C from engagement with cooker A; said lock 40 being formed of suitable spring steel stock and embodies an intermediate leg 49, integrated with the bottom leg 39 thereof and being configured to project upwardly through bracket opening 44. With reference to FIG. 5, it will be seen that said leg 49 is normally in contact with the outer surface of bowl 1 and terminates in contract with the under portion of rolled edge 6. Integral with lock intermediate leg 49, at the upper extremity thereof, is lock upper leg 50 which is substantially axially perpendicular thereto, progressing in overlying spaced relationship to hinge leaf 36. Said bracket upper leg 50 normally snugly abuts on the upper surface thereof with the cooker rolled edge 6 for thereby cooperating with bracket upper end 48 to effect a reliably gripping relationship with rolled edge 6 for inhibiting premature or accidental disengagement of bracket C, together with table B, from cooker A. Lock upper leg 50 continues freely through bracket opening 47 spacedly therefrom is provided with an upturned terminal 51 for facilitating flexure of said lock 40.

As shown in full lines in FIG. 5, lock 40 is in operative or latched position, serving to secure bracket C engagedly to cooker A whereby detachment of table B is inhibited. Should one desire to disunite table B and cooker A, all one need do is press downwardly thumb-receiving terminal 51 of lock 40 whereby through the resiliency of said lock 40 the upper and intermediate legs 49, 50 respectively thereof, will be bent downwardly into the portion shown in phantom lines in FIG. 5 whereby withdrawal from contact with rolled edge 6 will provide sufficient clearance so that bracket C may be lifted from engagement with rolled edge 6 and thus exert physical separation of cooker A and table B.

It should be self-evident that bracket C may be engaged on cooker rolled edge 6 by reverse action; that is, for the user to hold lock 40 in downward position until bracket C is hung on rolled edge 6, and then to release lock 40 to allow it to spring into latching condition.

Although the drawings illustrate table B as being connectable to cooker A by two brackets C, it is understood that a greater number might be utilized, if desired, but a pair has been found to be quite suitable for providing stability and reliability of interengagement.

From the foregoing, the operation of the present invention should be quite evident. In periods of disuse, table legs 21, 21' will be disposed adjacent the adjacent sides of table B, as shown in phantom lines in FIG. 2 and FIG. 3; with brace rods 24 being engaged to table B through reception of finger 27 within apertures 28. In such compact state, table B will be swingable downwardly, through gravity, about the pivot axis developed by hinge pintles 37 into inoperative position, shown in phantom lines in FIG. 1, wherein it is substantially planarwise perpendicular to the support surface. When it is desired to utilize table B, brace rods 24 are disengaged from apertures 28 and said table B is swung upwardly, legs 21, 21' dropping downwardly, through gravity into support position as support structure 20 rotates within the journal developed by brackets 18, 18'. Thereupon brace rods 24 are re-engaged to table B by insertion of fingers 27 within apertures 29, securing legs 21, 21' into table-supporting position. It will thus be seen that table B was accordingly swung about pintles 37 on hinges 31 for presentation in operative state as shown in full lines in FIG. 1. In this last mentioned position, top 13 of table B is disposed in immediate adjacency to cooker A, providing manifestly convenient support for utensils, implements, food items, and the like, as may be useful for the barbecuing operation and for serving purposes. The user is spared the necessity of moving back and forth between cooker A and some remote location or locations necessary for barbecuing.

As above set forth, table B is thus at all times adapted to be intimately and securely engaged to the associated cooker A, whether the latter is in a useful mode or otherwise. When cooker A is in a non-useful or storage state, table B will thus be presented in collapsed condition, depending from cooker A by means of connectors 30, 30' so that its availability is at all times assured.

What is claimed is:

1. In combination with a barbecue kettle cooker comprising a hemispherical firebowl, having an outwardly rolled upper peripheral edge, a hood provided for covering disposition upon said firebowl, and means supporting said cooker, an auxiliary table comprising a top or article support surface, and having inner and outer ends and intervening side portions, leg members swingably engaged to said table top at the outer end thereof, for movement between operative position wherein said leg members are in operative or table top supporting position and inoperative position wherein said leg members are presented in adjacency to the side portions of said top, brace means provided for interengaging said leg members and said table in the operative and inoperative positions of said leg menbers, and connector means for interengaging said table and said cooker at the inner end of said table top, said connector means comprising a bracket engageable upon the rolled peripheral edge of the cooker firebowl and a hinge securing said table top at the inner end thereof to the associated bracket whereby said table top is swingable between operative or article supporting position and inoperative position wherein said table depends downwardly for compact storage, said bracket includes an arcuated upper portion for snug reception upon the upper end of said cooker rolled peripheral edge, a central arm projecting downwardly from the arcuated upper portion, outwardly of the cooker, and intermediate substantially perpendicular to the central arm at the lower end thereof and being directed toward the outer face of the cooker firebowl, and a base wall entending away from said firebowl and having its firebowl remote extremity in underlying relationship to the associated hinge.

2. The combination as defined in claim 1 wherein locking means coacting with the associated bracket for preventing accidental disengagement of the associated bracket with the firebowl.

3. The combination as defined in claim 2 wherein said locking means comprise a leg engageable with the under portion of the cooker rolled peripheral edge for coordinating with the arcuated upper portion of said bracket for gripping said edge therebetween, said locking means being resilient whereby downward pressure applied thereon will effect removal of said leg from said rolled peripheral edge for permitting withdrawal of said bracket from said peripheral rolled edge.

4. The combination as defined in claim 3 wherein the hinge of said connectors is of leaf form having a first leaf secured to the inner end of said table top and a second leaf projecting toward said cooker, said second leaf being engaged to the lower arm of the related bracket whereby when said table is in operative position said first and second leaves will be in planar perpendicular relationship and when said table is in inoperative position said leaves will be substantially coplanar.

5. The combination as defined in claim 4 wherein swivel means are provided for interengaging the second hinge leaf and said bracket to allow relative swingable movement for accomodating the curvature of the cooker firebowl.

6. In combination with a barbecue kettle cooker comprising a hemispherical firebowl having an outwardly rolled upper peripheral edge, mobile means supporting said cooker, an auxiliary table comprising a top or article-support surface, and having an inner end and an outer end and intervening side portions, leg members swingably engaged to said table top at the outer or cooker remote end thereof for movement between operative position wherein said leg members are in support-surface engagement, or table top supporting position, and inoperative position wherein said leg members are presented in adjacency to the side portions of said top in non-supporting relationship thereto, a plurality of connectors for interengaging said table and said cooker at the inner end of said table top, said connectors being provided in circumferentially spaced-apart relationship upon said firebowl peripheral edge, each connector comprising a bracket engageable upon the rolled peripheral edge of the cooker firebowl and a hinge engaged to each bracket and said table top at the inner end thereof whereby said table top is secured swingably between operative or article supporting position and inoperative position wherein said table depends downwardly for compact storage, means associated with each connector for retaining the same securely upon said cooker so that the table top is movable with said cooker whether said table top is in operative or inoperative position and each connector comprises swivel means interengaging the related bracket and hinge to allow relative swingably movement for accommodating the curnature of the cooker firebowl.

7. The combination as defined in claim 6 wherein said bracket includes an arcuated upper portion for snug reception upon the upper end of said cooker rolled peripheral edge, a central arm projecting downwardly from the arcuated upper portion, outwardly of the cooker, and intermediate substantially perpendicular to the central arm at the lower end thereof and being directed toward the outer face of the cooker firebowl, and a base wall extending away from said firebowl and having its firebowl remote extremity in underlying relationship to the associated hinge.

8. The combination defined in claims 1 or 6 wherein brace means are provided for interengaging said table leg members and said table in a first or the operative position, and a second or the inoperative position of said leg members.

9. The combination as defined in claim 6 wherein said means associated with each connector for retaining same constitutes a locking member engageable with said cooker rolled peripheral edge.

10. The combination as defined in claim 6 wherein said means associated with each connector for retaining same comprises a locking member of resilient character for disposition in locked position by engaging said cooker rolled peripheral edge and unlocked or inoperative position by withdrawal from such engagement.

11. The combination as defined in claim 10 wherein said locking member comprises a leg engageable with the under portion of the cooker rolled peripheral edge for coordinating with the related bracket for gripping said edge therebetween, said locking member being resilient whereby downward pressure applied thereon will effect removal of said leg from said rolled peripheral edge for permitting withdrawal of said bracket with the associated hinge from said peripheral rolled edge.

12. The combination as defined in claim 6 wherein the hinge of said connectors is of leaf form having a first leaf secured to the inner end of said table top and a second leaf projecting toward said cooker, said second leaf being engaged to the lower arm of the related bracket whereby when said table is in operative position said first and second leaves will be in planar perpendicular relationship and when said table is in inoperative position said leaves will be substantially coplanar.

13. The combination as defined in claim 12 wherein swivel means are provided for interengaging the second hinge leaf and said bracket to allow relative swingable movement for accommodating the curvature of the cooker firebowl.

* * * * *